United States Patent [19]

Hirota

[11] Patent Number: 4,558,353
[45] Date of Patent: Dec. 10, 1985

[54] CIRCUIT FOR REDUCING NOISE IN A CARRIER CHROMINANCE SIGNAL
[75] Inventor: Akira Hirota, Chigasaki, Japan
[73] Assignee: Victor Company of Japan, Ltd., Japan
[21] Appl. No.: 472,884
[22] Filed: Mar. 8, 1983
[30] Foreign Application Priority Data
  Mar. 15, 1982 [JP] Japan ................................. 57-40497
[51] Int. Cl.[4] .......................................... H04N 9/535
[52] U.S. Cl. ..................................................... 358/36
[58] Field of Search ........................................... 358/36
[56] References Cited
U.S. PATENT DOCUMENTS
  4,302,768  11/1981  Kamura et al. ....................... 358/36

Primary Examiner—Richard Murray
Attorney, Agent, or Firm—Andrus, Sceales, Starke & Sawall

[57] ABSTRACT

A noise reducing circuit for reducing noise in a carrier chrominance signal comprises a bandpass filter supplied with an input carrier chrominance signal, where the bandpass filter has a narrow-band pass band of a center frequency equal to a chrominance subcarrier frequency of the input carrier chrominance signal, a first subtracting circuit supplied with the input carrier chrominance signal and an output signal of the bandpass filter, for carrying out subtraction between the two signals supplied thereto to obtain a noise signal component within the input carrier chrominance signal, an amplitude limiter for limiting the amplitude of an output signal of the first subtracting circuit, and a second subtracting circuit supplied with the input carrier chrominance signal and an output signal of the amplitude limiter, for carrying out subtraction between the two signals supplied thereto to produce a carrier chrominance signal reduced of the noise signal component.

7 Claims, 11 Drawing Figures

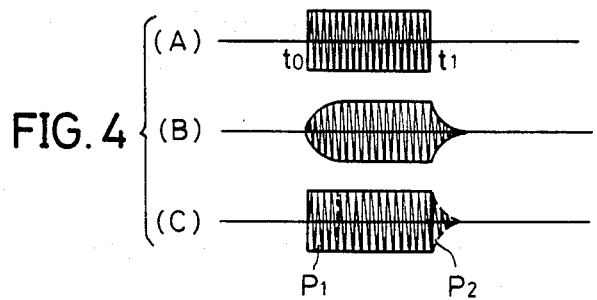
FIG. 4
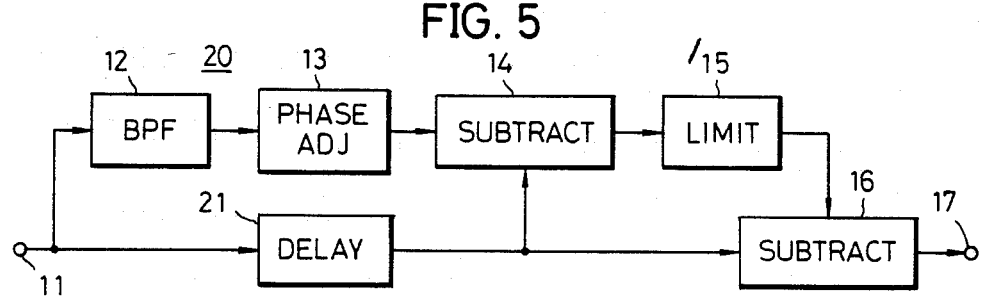
FIG. 5
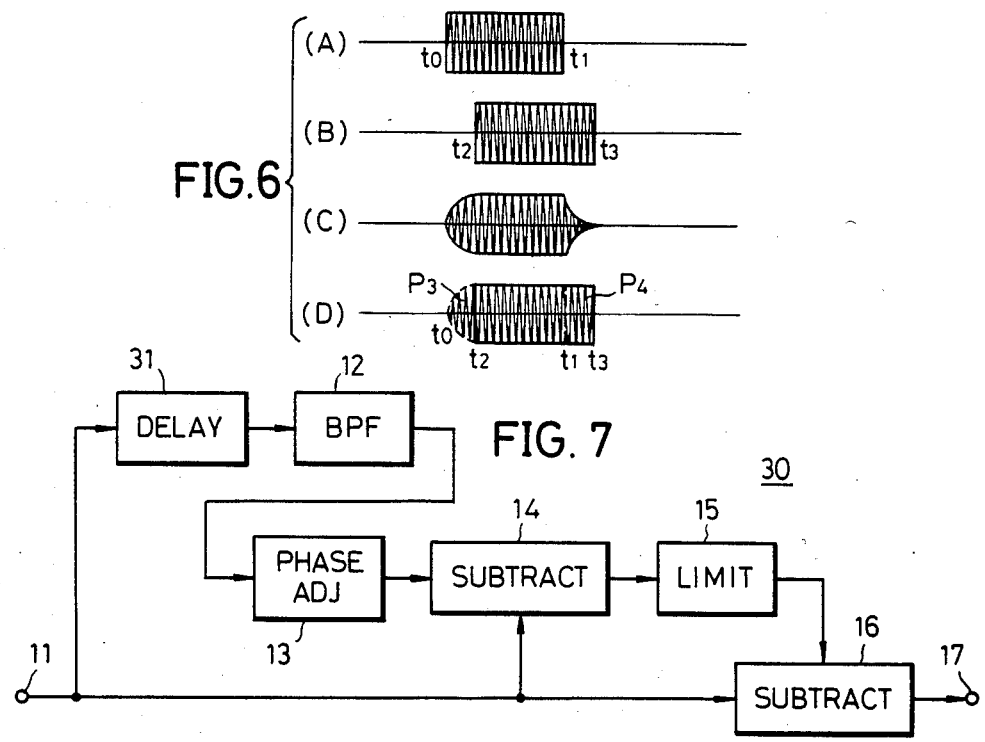
FIG. 6
FIG. 7

CIRCUIT FOR REDUCING NOISE IN A CARRIER CHROMINANCE SIGNAL

BACKGROUND OF THE INVENTION

The present invention generally relates to circuits for reducing noise in carrier chrominance signals, and more particularly to a noise reducing circuit capable of effectively eliminating a noise component within a carrier chrominance signal of a color video signal without much loss of an information signal component.

Conventionally, as a circuit for reducing noise in a carrier chrominance signal, there was a noise reducing circuit employing a feedback type comb filter. This comb filter had a filtering characteristic for passing only the chrominance subcarrier frequency 3.58 MHz and frequency components of the side bands thereof, for example. However, when there is no rapid change in the chrominance information of the carrier chrominance signal and the color is constant, the carrier chrominance signal does not have side bands. Thus, if the carrier chrominance signal passed through the above conventional noise reducing circuit is such that the color of the chrominance information of the carrier chrominance signal is constant and the carrier chrominance signal does not have side bands, there are no side bands which pass through the comb filter, however, a noise component within the side bands pass through the comb filter. As a result, the conventional noise reducing circuit suffered a disadvantage in that sufficient noise reduction could not be carried out.

SUMMARY OF THE INVENTION

Accordingly, it is a general object of the present invention to provide a novel and useful circuit for reducing noise in a chrominance signal, in which the above described disadvantage has been overcome.

Another and more specific object of the present invention is to provide a circuit for reducing noise in a carrier chrominance signal by obtaining a noise component by essentially carrying out subtraction between an input carrier chrominance signal and a frequency component in the vicinity of a chrominance subcarrier frequency which is obtained from this input carrier chrominance signal, and obtaining a carrier chrominance signal which is reduced of its noise component by essentially carrying out subtraction between the input carrier chrominance signal and the noise component thus obtained. According to the circuit of the present invention, the noise component can be effectively eliminated especially when there is no change or only a small change in color, that is, when side band components of the carrier chrominance signal are small.

Still another object of the present invention is to provide a circuit for reducing noise component in a carrier chrominance signal, wherein two kinds of noise reducing circuits which are in accordance with the principle of the present invention are connected in series. According to the circuit of the present invention, color blur which is introduced due to a time constant of a bandpass filter within the noise reducing circuit can be reduced to an extent so that the color blur is inconspicuous, and the noise component can be reduced and eliminated.

Other objects and further features of the present invention will be apparent from the following detailed description when read in conjunction with the accompanying drawings.

BRIEF DESCRIPTION OF THE DRAWINGS

FIGS. 4(A) through 4(C) are diagrams for explaining an undesirable phenomenon introduced due to the existence of a bandpass filter within the block system shown in FIG. 1;

FIG. 5 is a systematic block diagram showing a second embodiment of a circuit for reducing noise in a carrier chrominance signal according to the present invention;

FIGS. 6(A) through 6(D) are diagrams for explaining an undesirable phenomenon introduced due to the existence of a bandpass filter within the block system shown in FIG. 5;

FIG. 7 is systematic block diagram showing a third embodiment of the circuit for reducing noise in a carrier chrominance signal according to the present invention;

DETAILED DESCRIPTION

Figure 1:
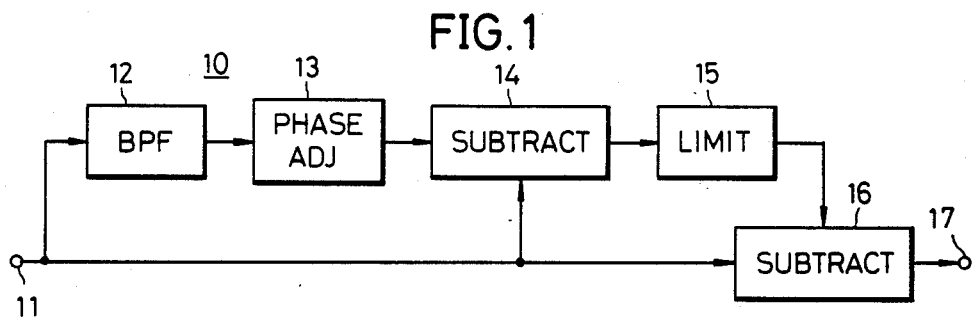
FIG. 1 is a systematic block diagram showing a first embodiment of a circuit for reducing noise in a carrier chrominance signal according to the present invention.

First, description will be given with respect to a first embodiment of a noise reducing circuit according to the present invention by referring to FIG. 1. A carrier chrominance signal which is separated from a composite color video signal generated from a television camera or reproduced by a recording and reproducing apparatus, is applied to an input terminal 11 of a noise reducing circuit 10. As shown in FIG. 2(A), the carrier chrominance signal applied to the input terminal 11 comprises a noise component which is superimposed with the original carrier chrominance signal. The carrier chrominance signal applied to the input terminal 11, is supplied to a bandpass filter 12, and subtracting circuits 14 and 16.

The bandpass filter 12 has a pass band which is narrower than the band of the original carrier chrominance signal including the side bands. The pass band of the bandpass filter 12 is selected to 3.58 MHz±200 kHz, for example, when the above composite color video signal is an NTSC system color video signal. The pass band of the bandpass filter 12 is selected to a band in the range of 4.43 MHz±200 kHz when the composite color video signal is a PAL system color video signal. Accordingly, a chrominance subcarrier frequency component shown in FIG. 2(B) is obtained by the bandpass filter 12. The output of the bandpass filter 12 is subjected to phase adjustment (phase delay) at a phase adjustor 13, and then supplied to the subtracting circuit 14. The phase adjustor 13 carries out the phase adjustment (phase delay) so that a phase difference of the signal waveform of the chrominance subcarrier frequency signal supplied to the subtracting circuit 14 through the phase adjustor 13 with respect to the signal waveform of the chrominance subcarrier frequency signal supplied directly to the subtracting circuit 14 from the input terminal 11, becomes an integral multiple of one-half the period of the signal waveform. The subtracting circuit 14 comprises a type of an adder, and adds the two signals as they are when the phase difference between the two signals is an odd multiple of one-half the period. In this state, the signal waveform which has passed through the phase adjustor 13 is in a reverse relation to the signal waveform which did not pass through the phase adjustor 13, a subtraction is essentially carried out by the above addition. On the other hand, when the phase difference between the two signals is an even multiple of one-half the period, the signal waveform which has passed through the phase adjustor 13 is in phase with the signal waveform which did not pass through the phase adjustor 13. Hence, in this case, the phase of one signal waveform is inverted and added to the other signal waveform. As a result, subtraction is essentially carried out between the two signal waveforms.

By subtracting the chrominance subcarrier frequency signal shown in FIG. 2(B) which is obtained through the bandpass filter 12 and the phase adjustor 13 from the input carrier chrominance signal shown in FIG. 2(A) which is obtained directly from the input terminal 11 at the subtracting circuit 14, only a noise signal component shown in FIG. 2(C) which is superimposed with the input carrier chrominance signal is obtained from the subtracting circuit 14. The output signal of the subtracting circuit 14 is limited of its amplitude at a limiter 15, and then supplied to the subtracting circuit 16. Subtraction is carried out between the input carrier chrominance signal shown in FIG. 2(A) which is obtained directly from the input terminal 11 and the noise signal component shown in FIG. 2(C) which is obtained through the limiter 15, and the output of the subtracting circuit 16 is obtained through an output terminal 17. Accordingly, a carrier chrominance signal shown in FIG. 2(D) which is eliminated of its noise signal component is obtained through the output terminal 17. Hence, when there is no change in color of the chrominance information such that the color continues to be uniform in the reproduced picture, the ideal signal waveforms at each part of the system shown in FIG. 1 become as shown in FIGS. 2(A) through 2(D). Thus, it is possible to obtain a carrier chrominance signal eliminated of the noise signal component, and which does not introduce color spreading or running as will be described hereinafter.

If the pass band of the bandpass filter 12 is set to a wide band, the noise component will pass through the bandpass filter 12. As a result, it becomes impossible to effectively obtain the noise component at the subtracting circuit 14, and the effect of noise reduction on the carrier chrominance signal obtained from the subtracting circuit 16 becomes small. On the other hand, if the pass band of the bandpass filter 12 is set to an excessively narrow band, the time constant of the filter becomes large. Hence, in this case, the range where it is impossible to follow the frequency change in the carrier chrominance signal becomes large, and large color running occurs after the color changes.

Figure 3:
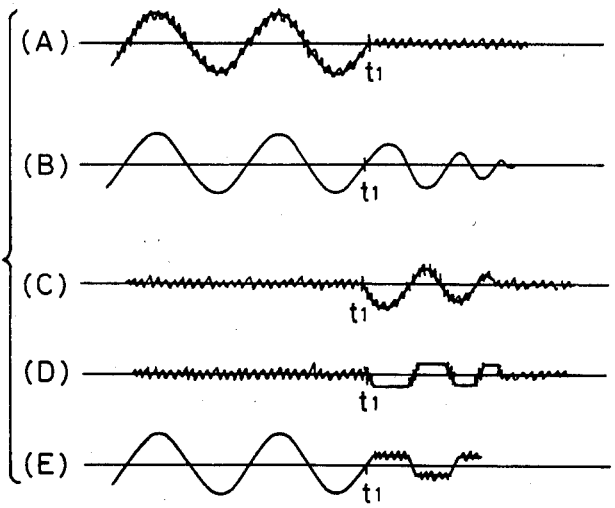
FIGS. 3(A) through 3(E) are graphs respectively showing signal waveforms at each part of the block system shown in FIG. 1 when there is change in color of the chrominance information of the carrier chrominance signal.

Explaining the above phenomenon in more detail in conjunction with FIG. 3, if the color in the input carrier chrominance signal disappears at a time t1 as shown in FIG. 3(A), an output which gradually decreases after the time t1 as shown in FIG. 3(B) is obtained from the bandpass filter 12 due to the time constant of the filter. For this reason, the output of the subtracting circuit 14 becomes as shown in FIG. 3(C), and large amplitude part after the time t1 is amplitude-limited as shown in FIG. 3(D). Hence, the output signal waveform of the subtracting circuit 16 at this point becomes as shown in FIG. 3(E). Because this amplitude fluctuation component after the time t1 exists although the amplitude should actually be zero as shown in FIG. 3(A), the amplitude fluctuation component after the time t1 appears as color running in the reproduced picture. If the limiting level of the limiter 15 is set to a low level (small level), the amplitude fluctuation component after the time t1 becomes small as shown in FIG. 3(E) and there is little color running, however, when the noise component is also amplitude-limited, the effect of noise reduction becomes small. Accordingly, the limiting level of the limiter 15 is set to a level such that there is little color running and still be able to provide sufficient noise reducing effect. The pass band of the bandpass filter 12 is selected to a bandwith such that the above noise reducing effect can be obtained and there is little color running. A most suitable example of the pass band of the bandpass filter 12 is 3.58 MHz±200 kHz given before.

If the signal waveforms are observed in terms of their envelopes, the envelope of the output signal of the bandpass filter 12 becomes as shown in FIG. 4(B) with respect to the envelope of the input carrier chrominance signal shown in FIG. 4(A) comprising changes in color at time t0 and t1. Hence, color running is introduced at parts indicated by P1 and P2 for predetermined intervals after the times t0 and t1 as shown in FIG. 4(C), in the signal obtained through the output terminal 17 which is reduced of the noise. That is, the color running occurs after the point when there is a change in color. However, in some cases, it is desirable to introduce the color running before the change in color, and in such a case, the measures in the following embodiment are taken.

FIG. 5 shows a second embodiment of a noise reducing circuit according to the present invention. In FIG. 5, these parts which are the same as those corresponding parts in FIG. 1 are designated by the same reference numerals, and their description will be omitted. In the present embodiment, a delay circuit 21 is provided in parallel with the series connected bandpass filter 12 and the phase adjustor 13, in the signal path between the input terminal 11 and the subtracting circuits 14 and 16, within a noise reducing circuit 20. The input carrier chrominance signal from the input terminal 11 is delayed at the delay circuit 21 and supplied to the subtracting circuits 14 and 16. The quantity of the delay circuit 21 is selected substantially equal to the delay quantity of the bandpass filter 12.

The input carrier chrominance signal applied to the input terminal 11 which comprises change in color at times t0 and t1 as shown in FIG. 6(A), is delayed by the delay circuit 21 and formed into a carrier chrominance signal shown in FIG. 6(B) comprising the change in color at times t2 and t3. On the other hand, the envelope of the signal waveform which is supplied to the subtracting circuit 14 through the bandpass filter 12 and the phase adjustor 13, becomes as shown in FIG. 6(C). Accordingly, the signal obtained through the output terminal 17 which is reduced of the noise has an envelope shown in FIG. 6(D). As shown in FIG. 6(D), the color running occurs at parts indicated by P3 and P4 respectively between times t0 and t2 and times t1 and t3. Accordingly, according to the noise reducing circuit of the present embodiment, the color running occurs before the color change.

However, because the delay circuit 21 is provided in the main transmission path of the input carrier chrominance signal in the embodiment shown in FIG. 5, there are cases where undesirable effects are obtained. Hence, it is desirable not to provide the delay circuit in the main transmission path of the input carrier chrominance signal, so as not to introduce changes in the phase. Accordingly, an embodiment wherein the delay circuit is not provided in the main transmission path of the input carrier chrominance signal, and still be capable of obtaining effects substantially the same as those obtained by the circuit shown in FIG. 5, is shown in FIG. 7. In FIG. 7, those parts which are the same as those corresponding parts in FIGS. 1 and 5 are designated by the same reference numerals, and their description will be omitted.

In the embodiment shown in FIG. 7, a delay circuit 31 is provided in the signal path between the input terminal 11 and the bandpass filter 12, within a noise reducing circuit 30. The delay quantity of the delay circuit 31 is selected to a delay quantity which is obtained by subtracting the delay time ($\Delta$) of the bandpass filter 12 from one horizontal scanning period (1H) of the video signal.

In the noise reducing circuit 30, the subtracting circuit 14 carries out subtraction between the input carrier chrominance signal directly obtained from the input terminal 11, and a chrominance subcarrier frequency signal which is delayed by substantially one horizontal scanning period with respect to the input carrier chrominance signal by being passed through the delay circuit 31, the bandpass filter 12, and the phase adjustor 13.

Generally, there is line correlation in the video signal, which means that the video information of the video signal separated by one horizontal scanning period are mutually similar. Accordingly, there is line correlation between the signal which is delayed by one horizontal scanning period by being passed through the delay circuit 31, the bandpass filter 12, and the phase adjustor 13, and the signal directly obtained from the input terminal 11, and the noise reduction can be effectively carried out for this reason. The envelope of the signal obtained through the output terminal 17 becomes as shown in FIG. 6(D).

However, if the limiting level of the limiter 15 is set to a high level in the embodiments described heretofore, the rate at which the amplitude of the large amplitude part within the output signal of the subtracting circuit 14 shown in FIG. 3(C) after the occurrence of the color change is limited becomes small. Thus, a large portion of the noise component which is superimposed with this large amplitude part become passed. Hence, the noise within the signal obtained through the output terminal 17 is reduced, however, there is a large amplitude fluctuation component after the time t1 indicated in FIG. 3(E), and the color running becomes large. If the limiting level of the limiter 15 is set to a low level, the color running becomes small, however, the noise reducing effect becomes somewhat small, in contrast to the former case when the limiting level of the limiter 15 is set to a high level. On the other hand, even if the range in which the color running occurs increases somewhat on the reproduced picture, there is no problem as long as the color running is to an extent such that the color running is visually inconspicuous. Thus, by taking this fact into consideration, an embodiment will be described in conjunction with FIG. 8 wherein the color running only occurs to an extent such that the color running is visually inconspicuous and the noise reduction is effectively carried out.

Figure 2:
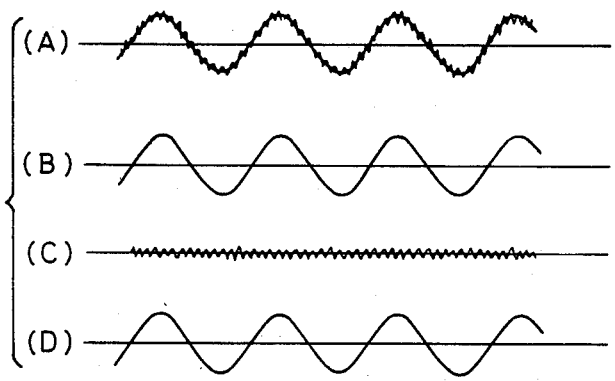
FIGS. 2(A) through 2(D) are graphs respectively showing signal waveforms at each part of the block system shown in FIG. 1 when there is no change in color of the chrominance information of the carrier chrominance signal.
Figure 8:
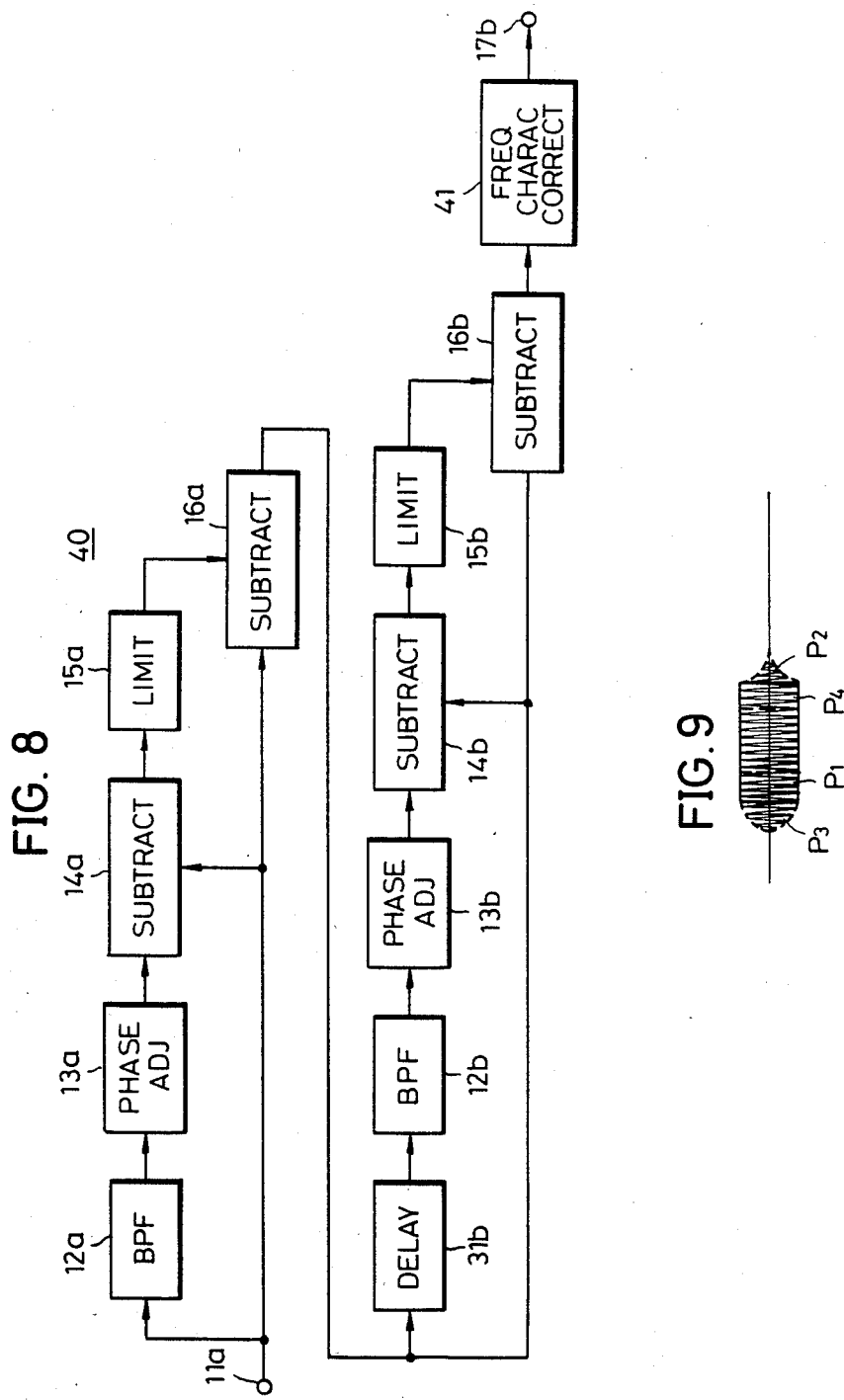
FIG. 8 is a systematic block diagram showing a fourth embodiment of a circuit for reducing noise in a carrier chrominance signal according to the present invention.

In FIG. 8, those parts which correspond to the parts shown in FIG. 1 are designated by the same reference numeral with a subscript "a", those part which correspond to the part shown in FIG. 7 are designated by the same reference numeral with a subscript "b", and description of these parts will be omitted.

In a noise reducing circuit 40 shown in FIG. 8, a bandpass filter 12a, phase adjustor 13a, subtracting circuits 14a and 16a, and limiter 15a, are of the same connection and construction as those corresponding parts of the noise reducing circuit 10 shown in FIG. 1. The output signal of the subtracting circuit 16a is supplied to a delay circuit 31b and subtracting circuits 14b and 16b. The delay circuit 31b, bandpass filter 12b, phase adjustor 13b, subtracting circuits 14b and 16b, and limiter 15b, are of the same connection and construction as those corresponding parts of the noise reducing circuit 30 shown in FIG. 7. Accordingly, the noise reducing circuit 40 is equivalent to a circuit wherein the noise reducing circuits 10 and 30 respectively shown in FIGS. 1 and 7 are connected in series. However, in the noise reducing circuit 40 according to the present embodiment, the limiting levels of the limiters 15a and 15b are selected to limiting levels such that the color running is visually inconspicuous and the noise reduction can be effectively carried out as described before. The output signal of the subtracting circuit 16b is passed through a frequency characteristic correcting circuit 41, and then obtained through an output terminal 17b.

Figure 9:
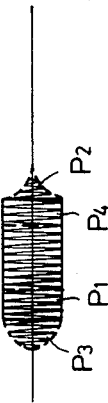
FIG. 9 is a graph showing an output signal waveform of the noise reducing circuit shown in FIG. 8.

According to the noise reducing circuit 40 of the present embodiment, parts indicated by P1 through P4 in FIG. 9 where the color running occurs become larger compared to the cases shown in FIGS. 4(C) and 6(D), however, there is no problem since the color running only occurs to an extent such that the color running is visually inconspicuous. As a result, a signal finely reduced of its noise, can be obtained according to this embodiment.

Figure 10:
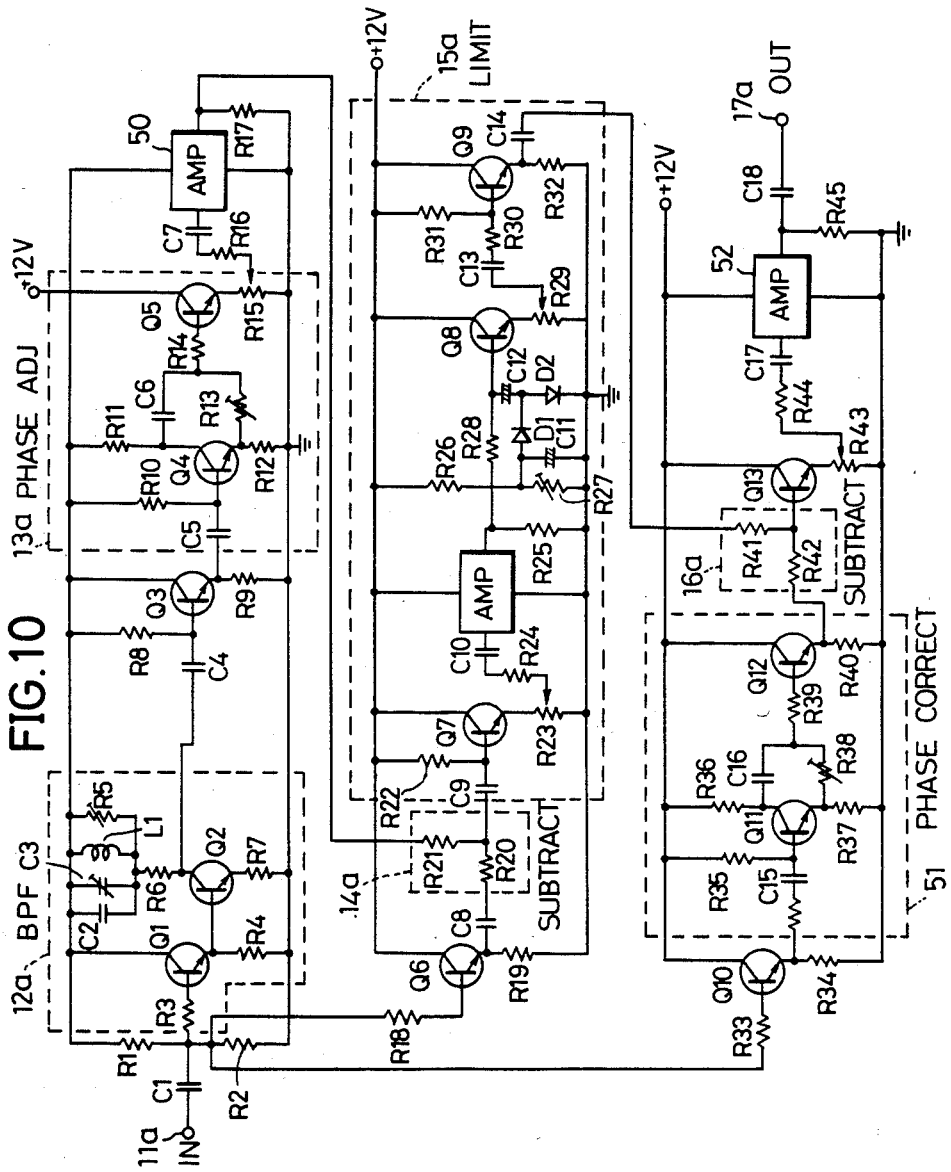
FIG. 10 is a circuit diagram showing an embodiment of a concrete electrical circuit of a block system similar to the block system shown in FIG. 1, used in the block system shown in FIG. 8.
Figure 11:
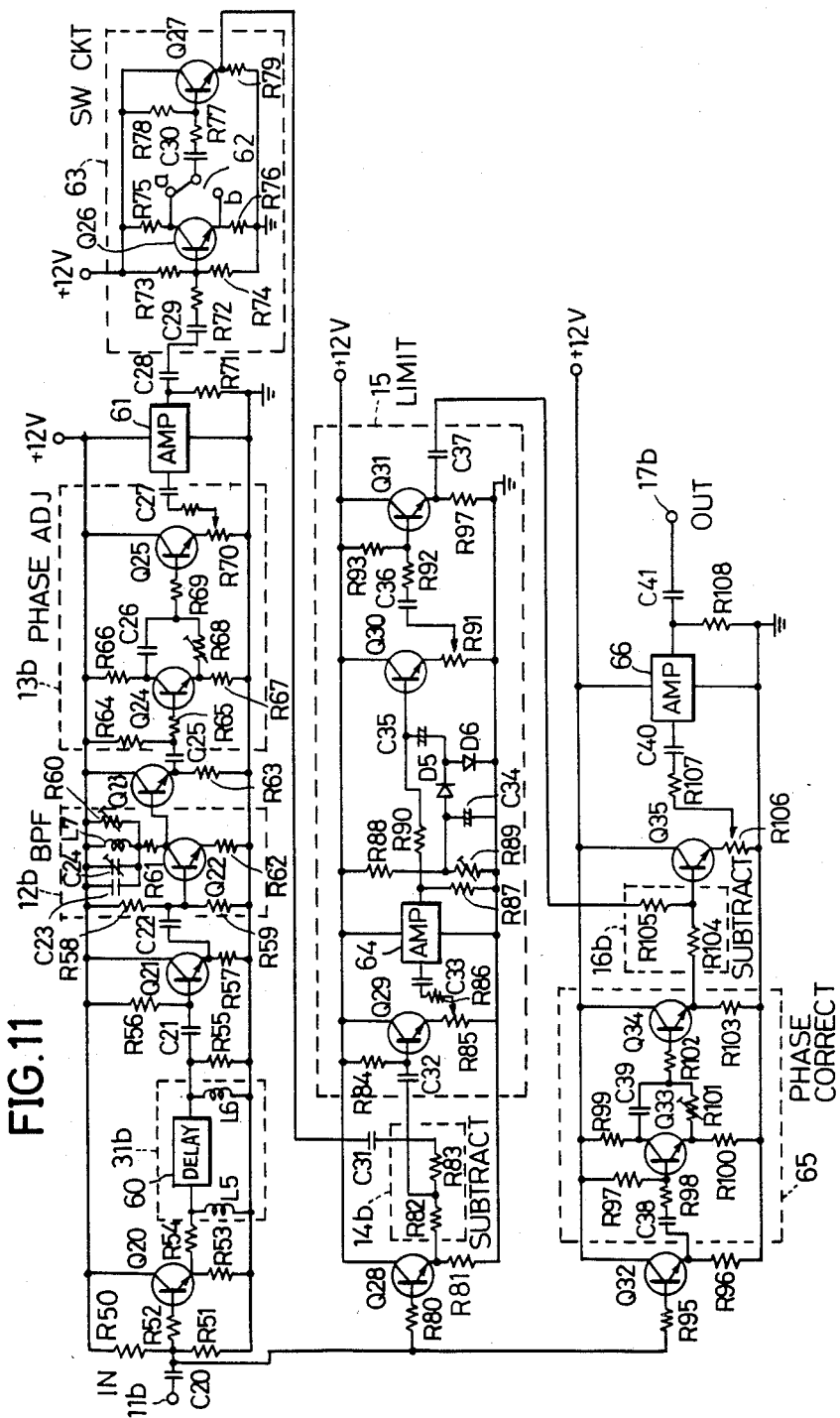
FIG. 11 is a circuit diagram showing an embodiment of a concrete electrical circuit of a block system similar to the block system shown in FIG. 5, used in the block system shown in FIG. 8.

Embodiments of concrete electrical circuits corresponding to parts of the block systems shown in FIGS. 1 and 7, in the block system shown in FIG. 8, are respectively shown in FIGS. 10 and 11.

In FIG. 10, the input carrier chrominance signal applied to the input terminal 11a, is supplied to the bandpass filter 12a comprising transistors Q1 and Q2, resistors R3 through R7, capacitors C2 and C3, and a coil L1 and having a pass band 3.58 MHz±200 kHz. The output signal of the bandpass filter 12a is passed through a buffer transistor Q3, and supplied to the phase adjustor 13a comprising transistors Q4 and Q5, resistors R10 through R15, and capacitors C5 and C6. The output signal of the phase adjustor 13a is then passed through an amplifier 50, and applied to a resistor R21 of the subtracting circuit (adder) 14a comprising resistors R20 and R21. On the other hand, the input carrier chrominance signal applied to the input terminal 11a is applied to the resistor R20 of the subtracting circuit 14a, through a buffer transistor Q6. The signals applied to the resistors R21 and R20 are added at a connection point between these resistors R21 and R20. In this state, the output polarity of the amplifier 50 is inverted with respect to the input carrier chrominance signal, and subtraction is essentially carried out by the above described addition.

The output signal of the subtracting circuit 14a is supplied to the limiter 15a comprising transistors Q7 through Q9, resistors R22 through R32, capacitors C9 through C14, and diodes D1 and D2, and the output of the limiter 15a is supplied to the subtracting circuit (adder) 16a comprising resistors R41 and R42. On the other hand, the input carrier chrominance signal applied to the input terminal 11a is passed through a buffer transistor Q10, and then supplied to a phase correcting circuit 51 comprising transistors Q11 and Q12, resistors R35 through R40, and capacitors C15 and C16. The phase correcting circuit 51 is provided to correct the phase of the input carrier chrominance signal which is affected of its phase by the limiter 15a. The output signal of the phase correcting circuit 51 is applied to the resistor R42 of the subtracting circuit 16a. Subtraction is essentially carried out in the subtracting circuit 16a, and the output signal of the subtracting circuit 16a is passed through a transistor Q13 and an amplifier 52, and obtained through the output terminal 17a.

In FIG. 11, the signal obtained through the output terminal 17a shown in FIG. 10 is applied to the input terminal 11b. The input carrier chrominance signal applied to the input terminal 11b is passed through a transistor Q20, and then supplied to the delay circuit 31b comprising a delay line 60 having a delay quantity (1H−Δ) and coils L5 and L6. The output signal of the delay circuit 31b is passed through a buffer transistor Q21, and supplied to the bandpass filter 12b comprising a transistor Q22, resistors R58 through R62, capacitors C23 and C24, and a coil L7. The output signal of the bandpass filter 12b is passed through a buffer transistor Q23, and supplied to the phase adjustor 13b comprising transistors Q24 and Q25, resistors R64 through R70, and capacitors C26 and C27. The output signals of the phase adjustor 13b is passed through an inverting amplifier 61, and supplied to a switching circuit 63 comprising transistors Q26 and Q27, resistors R72 through R79, capacitors C29 and C30, and a switch 62. A movable contact of the switch 62 is switched over between contact points a and b. The output signal polarity at the contact points a and b of the switch 62 respectively are positive and negative. The output signal of the switching circuit 63 is applied to a resistor R83 of the subtracting circuit 14b which comprises resistors R82 and R83.

On the other hand, the input carrier chrominance signal applied to the input terminal 11b is passed through a buffer transistor Q28, and applied to the resistor R82 of the substracting circuit 14b. The two signals are essentially subtracted at the subtracting circuit 14b, and the output of the subtracting circuit 14b is supplied to the limiter 15b comprising transistors Q29 through Q31, resistors R84 through R94, capacitors C32 through C37, an amplifier 64, and diodes D5 and D6. The output signal of the limiter 15b is applied to a resistor R104 of the subtracting circuit 16b which comprises resistors R103 and R104. The input carrier chrominance signal applied to the input terminal 11b is also passed through a buffer transistor Q32, and supplied to a phase correcting circuit 65 comprising transistors Q33 and Q34, resistors R97 through R103, and capacitors C38 and C39. The phase correcting circuit 65 is provided for the same reason as the phase correcting circuit 51 shown in FIG. 10. The output signal of the phase correcting circuit 65 is applied to a resistor R104 of the subtracting circuit 16b. Subtraction is essentially carried out in the subtracting circuit 16b, and the output signal of the subtraction circuit 16b is passed through a transistor Q35 and an amplifier 66, and obtained through the output terminal 17b.

Examples of constants of the circuit elements constituting the main parts of the circuits shown in FIGS. 10 and 11, are given in the following.

| | | | | |
|---|---|---|---|---|
| Resistors | R3 | 560Ω | R4 | 2.2KΩ |
| | R5 | 4.7KΩ | R6 | 680Ω |
| | R7 | 2.2KΩ | R10 | 100KΩ |
| | R11 | 470Ω | R12 | 470Ω |
| | R13 | 2.2KΩ | R14 | 560Ω |
| | R15 | 2.2KΩ | R20, R21 | 2.2KΩ |
| | | | R22 | 220KΩ |
| | R23 | 2.2KΩ | R24 | 560Ω |
| | R25 | 2.7KΩ | R26 | 22KΩ |
| | R27 | 4.7KΩ | R28 | 3.3KΩ |
| | R29 | 2.2KΩ | R30 | 560Ω |
| | R31 | 220KΩ | R32 | 2.2KΩ |
| | R35 | 100KΩ | R36 | 490Ω |
| | R37 | 470Ω | R38 | 2.2KΩ |
| | R39 | 560Ω | R40 | 1KΩ |
| | R41, R42 | 2.2KΩ | | |
| Capacitors | C2 | 560 PF | C3 | 50 PF |
| | C6 | 180 PF | C16 | 56 PF |
| Coils | L1 | 3.3 μH | | |
| Resistors | R58 | 56KΩ | R59 | 22KΩ |
| | R60 | 4.7KΩ | R61 | 680Ω |
| | R62 | 2.2.KΩ | R66, R67 | 470Ω |
| | | | R68 | 2.2KΩ |
| | R70 | 1KΩ | R72 | 100Ω |
| | R73 | 56KΩ | R74 | 22KΩ |
| | R75, R76 | 1KΩ | R77 | 560Ω |
| | R78 | 220KΩ | R79 | 2.2KΩ |
| | R82, R83 | 2.2KΩ | R84 | 220KΩ |
| | R85 | 2.2KΩ | R86 | 330Ω |
| | R87 | 2.7KΩ | R88 | 22KΩ |
| | R89 | 4.7KΩ | R90 | 3.3KΩ |
| | R91 | 7.2KΩ | R92 | 560Ω |
| | R93 | 220KΩ | R94 | 2.2KΩ |
| | R97 | 100KΩ | R98 | 100Ω |
| | R79, R100 | 470Ω | R101 | 7.2KΩ |
| | R102 | 560Ω | R103 | 1KΩ |
| | R104, R105 | 2.2KΩ | | |
| Capacitors | C23 | 560 PF | C24 | 50 PF |
| | C26 | 180 PF | C39 | 56 PF |
| Coils | L5 | 15 μH | L6 | 1.5 μH |
| | L7 | 33 μH | | |

Further, the present invention is not limited to these embodiments, but various variations and modifications may be made without departing from the scope of the present invention.

What is claimed is:

1. A noise reducing circuit for reducing noise in a carrier chrominance signal comprising:
bandpass filter means supplied with an input carrier chrominance signal, said bandpass filter means having a narrow-band pass band of a center frequency equal to a chrominance subcarrier frequency of said input carrier chrominance signal;
a first subtracting circuit supplied with said input carrier chrominance signal and an output signal of the said bandpass filter means, for carrying out subtraction between the two signals supplied thereto to obtain a noise signal component within said input carrier chrominance signal;

an amplitude limiter for limiting the amplitude of an output signal of said first subtracting circuit; and a second subtracting circuit supplied with said input carrier chrominance signal and an output signal of said amplitude limiter, for carrying out subtraction between the two signals supplied thereto to produce a carrier chrominance signal reduced of the noise signal component.

2. A noise reducing circuit as claimed in claim 1 which further comprises phase adjusting means provided in a signal transmission path between said bandpass filter means and said first subtracting circuit, for adjusting the phase of the output signal of said bandpass filter means so that the phase of the output signal of the said bandpass filter means is delayed by an integral multiple of one-half a period of the chrominance subcarrier frequency signal of said input carrier chrominance signal supplied to said first subtracting circuit with respect to the phase of said chrominance subcarrier frequency signal.

3. A noise reducing circuit as claimed in claim 1 in which said bandpass filter means has a pass band of a bandwidth in a range of ±200 kHz about a center frequency equal to the chrominance subcarrier frequency.

4. A noise reducing circuit as claimed as claim 1 which further comprises delay means provided in a signal transmission path through which said input carrier chrominance signal is supplied to said first and second subtracting circuits, in parallel to said bandpass filter means, for delaying said input carrier chrominance signal by a delay quantity substantially equal to a signal delay quantity of said bandpass filter means due to its time constant.

5. A noise reducing circuit as claimed in claim 1 which further comprises delay means provided in a signal transmission path through which the chrominance subcarrier frequency signal of said input carrier chrominance signal is supplied to said first subtracting circuit through said bandpass filter means, for delaying said input carrier chrominance signal by a delay quantity which is obtained by subtracting a delay quantity substantially equal to a signal delay quantity of said bandpass filter means due to its time constant from one horizontal scanning period of said video signal.

6. A noise reducing circuit for reducing noise in a carrier chrominance signal comprising:

first bandpass filter means supplied with an input carrier chrominance signal, said first bandpass filter means having a narrow-band pass band of a center frequency equal to a chrominance subcarrier frequency of said input carrier chrominance signal;

a first subtracting circuit supplied with said input carrier chrominance signal and an output signal of said first bandpass filter means, for carrying out subtraction between the two signals supplied thereto to obtain a noise signal component within said input carrier chrominance signal;

first amplitude limiter for limiting the amplitude of an output signal of said first subtracting circuit;

a second subtracting circuit supplied with said input carrier chrominance signal and an output signal of said first amplitude limiter, for carrying out subtraction between the two signals supplied thereto to produce a carrier chrominance signal reduced to the noise signal component;

delay means supplied with an output signal of said second subtracting circuit, for delaying the output signal of said second subtracting circuit;

second bandpass filter means supplied with an output signal of said delay means, said second bandpass filter having a narrow-band pass band of a center frequency equal to a chrominance subcarrier frequency of the carrier chrominance signal obtained from said second subtracting circuit through said delay means, said delay means delaying the output signal of said second subtracting circuit by a delay quantity which is obtained by subtracting a delay quantity substantially equal to a signal delay quantity of said second bandpass filter means from one horizontal scanning period of the video signal;

a third subtracting circuit supplied with the output of said second subtracting circuit and an output signal of said second bandpass filter means, for carrying out subtraction between the two signals supplied thereto to obtain a noise signal component within the output signal of said second subtracting circuit;

a second amplitude limiter for limiting the amplitude of an output signal of said third subtracting circuit; and a fourth subtracting circuit supplied with the output signal of said second subtracting circuit and an output signal of said second amplitude limiter, for carrying out subtraction between the two signals supplied thereto to produce a carrier chrominance signal reduced of the noise signal component.

7. A noise reducing circuit as claimed in claim 6 which further comprises first phase adjusting means provided in a signal transmission path between said first bandpass filter means and said first subtracting circuit, for adjusting the phase of the output signal of said first bandpass filter means so that the phase of the output signal of said first bandpass filter means is delayed by an integral multiple of one-half a period of the chrominance subcarrier frequency of said input carrier chrominance signal supplied to said first subtracting circuit with respect to the phase of said chrominance subcarrier frequency signal thereof, and second phase adjusting means provided in a signal transmission path between said second bandpass filter means and said third subtracting circuit, for adjusting the phase of the output signal of said second bandpass filter means so that the phase of the output signal of said second bandpass filter means is delayed an integral multiple of one-half a period of the chrominance subcarrier frequency signal of said input carrier chrominance signal supplied to said third subtracting circuit with respect to the phase of said chrominance subcarrier frequency signal thereof.

* * * * *